(12) United States Patent
Wilske et al.

(10) Patent No.: US 10,773,745 B2
(45) Date of Patent: Sep. 15, 2020

(54) STEERING HANDLE

(71) Applicant: Volkswagen Aktiengesellschaft, Wolfsburg (DE)

(72) Inventors: Ernst Wilske, Nedlitz (DE); Mark Klügel, Wolfsburg (DE); Klaas-Simon Jenke, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/609,068

(22) PCT Filed: Mar. 29, 2018

(86) PCT No.: PCT/EP2018/058246
§ 371 (c)(1),
(2) Date: Oct. 28, 2019

(87) PCT Pub. No.: WO2018/197153
PCT Pub. Date: Jan. 11, 2018

(65) Prior Publication Data
US 2020/0148248 A1    May 14, 2020

(30) Foreign Application Priority Data
Apr. 28, 2017 (DE) .................. 10 2017 207 272

(51) Int. Cl.
*B62D 1/10* (2006.01)
*B60R 21/203* (2006.01)
*B62D 5/04* (2006.01)

(52) U.S. Cl.
CPC ............ *B62D 1/105* (2013.01); *B60R 21/203* (2013.01); *B62D 5/0403* (2013.01); *B60Y 2400/307* (2013.01)

(58) Field of Classification Search
CPC . B62D 1/04; B62D 1/10; B62D 1/105; B62D 1/16; B62D 5/00; B62D 5/001;
(Continued)

(56) References Cited

U.S. PATENT DOCUMENTS 4,608,550 A * 8/1986 Umebayashi ......... B60R 16/027
                                                        180/78
5,010,784 A * 4/1991 Nakazato .............. B60R 16/027
                                                        116/31
(Continued)

FOREIGN PATENT DOCUMENTS

DE    102017207272 A1    10/1918    ............... B62D 5/04
DE      19539101 C1      2/1997    ............... B62D 5/00
(Continued)

OTHER PUBLICATIONS

Machine Translation of DE 102006059972, obtained Mar. 23, 2020.*

(Continued)

*Primary Examiner* — Richard W Ridley
*Assistant Examiner* — Brian J McGovern
(74) *Attorney, Agent, or Firm* — Slayden Grubert Beard PLLC

(57) ABSTRACT

A steering handle for inputting a driver's steering command into a steer-by-wire vehicle steering mechanism comprises a rotatably mounted main part for actuation by the driver. A transmission is arranged in a receptacle on the main part, an input member of the transmission can be coupled to an electric motor, and an output member of the transmission is coupled to the main part.

18 Claims, 6 Drawing Sheets

(58) Field of Classification Search
CPC .......... B62D 5/005; B62D 5/006; B62D 5/04;
B62D 5/0403
See application file for complete search history.

(56) References Cited

U.S. PATENT DOCUMENTS

| | | | |
|---|---|---|---|
| 5,803,202 A | 9/1998 | Bohner et al. | 180/443 |
| 2003/0067147 A1 | 4/2003 | Holmes et al. | 280/731 |
| 2005/0156415 A1 | 7/2005 | Holmes et al. | 280/731 |
| 2007/0099465 A1 | 5/2007 | Ruetz | 439/164 |
| 2019/0016365 A1* | 1/2019 | Swamidason | B62D 5/006 |

FOREIGN PATENT DOCUMENTS

| | | | | |
|---|---|---|---|---|
| DE | 10157797 A1 | 9/2002 | ............... | B62D 5/00 |
| DE | 10248343 A1 | 8/2003 | ............... | B62D 5/00 |
| DE | 102005053183 A1 | 5/2007 | ............... | B62D 1/04 |
| DE | 102006059972 A1 | 6/2008 | ............... | B62D 3/02 |
| EP | 1342639 A2 | 9/2003 | ............... | B62D 1/10 |
| EP | 1783030 A1 | 5/2007 | ............... | B62D 1/10 |
| EP | 2896547 A1 | 7/2015 | ............... | B62D 5/00 |
| FR | 2918028 A1 | 1/2009 | ............... | B62D 1/10 |
| JP | 2004182061 A | 7/2004 | ............... | B62D 5/04 |
| JP | 2007030804 A | 2/2007 | ............... | B62D 1/16 |
| JP | 2008296654 A | 12/2008 | ............ | B60R 21/16 |
| WO | 2018/197153 A1 | 11/1918 | ............... | B62D 1/10 |

OTHER PUBLICATIONS

German Search Report, Application No. 102017207272.5, 8 pages, dated Feb. 6, 2018.
International Search Report and Written Opinion, Application No. PCT/EP2018/058246, 8 pages, dated Jun. 15, 2018.
Korean Office Action, Application No. 2020037765017, 6 pages, dated Jun. 1, 2020.

* cited by examiner

STEERING HANDLE

CROSS-REFERENCE TO RELATED APPLICATIONS

This application claims priority to German Patent Application No. 10 2017 207 272.5, filed on Apr. 28, 2017 with the German Patent and Trademark Office. The contents of the aforesaid Patent Application are incorporated herein for all purposes.

TECHNICAL FIELD

The invention relates to a steering handle for inputting a driver's steering command into a steer-by-wire vehicle steering system comprising a rotatably mounted main body for actuation by the driver.

BACKGROUND

With steer-by-wire vehicle steering systems, there is no mechanical connection between a steering wheel and the steered vehicle wheels. Instead, the steering handle in such a vehicle steering system serves as an input device for a driver's steering command that is detected by suitable sensors. A desired steering angle of the steered vehicle wheels is adjusted by means of the steering command, possibly taking into account other vehicle parameters, and an adjusting apparatus actuating the vehicle wheels. Due to the lack of a mechanical connection, the driver does not experience any direct feedback from the vehicle wheels. Even with a steer-by-wire vehicle steering system, it is nonetheless desirable to communicate to the driver a steering sensation that basically corresponds to that of a conventional vehicle steering system with a mechanical coupling between the steering wheel and the vehicle wheels, i.e., when steering, the driver experiences a resistance from the steering wheel depending on the driving situation, and can return the steering wheel into its straight-ahead position.

A steering handle for a steer-by-wire vehicle steering system is known from DE 101 57 797 A1. On the one hand DE 101 57 797 A1 proposes actively providing the resistance by means of an electric motor and, on the other hand, additionally providing a passive apparatus that produces additional reaction torque to a steering command by the driver. By doing this, a main body of the steering handle is connected to a shaft for conjoint rotation that, for its part, is drivingly coupled to a rotor of an electric motor, wherein a planetary gear is arranged between the shaft and the electric motor to reduce the rotational speed of the electric motor. The planetary gear is arranged on the side of the electrical motor facing away from the main body. In a region between the main body and the electric motor, the rotatable shaft is provided with a thread on its outer circumference that engages with a ball screw nut. Given a rotary movement of the main body and hence the shaft, the ball screw nut is axially displaced against the force of return springs in order to produce opposing torque for manual torque applied to the main body by the driver. The passive device especially serves to further produce a resistance in the event of a failure of the electric motor in order to make it easier to handle the vehicle.

SUMMARY

Against this background, an object exists to create a steering handle for a steer-by-wire vehicle steering system that enables greater leeway with regard to positioning in the vehicle.

The object is achieved by a steering handle according to claim 1.

The steering handle in one exemplary aspect provides a receptacle that is formed on the main body in which a gear unit is arranged, wherein an input element of the gear unit can be coupled to an electric motor and/or an electric brake apparatus, and an output member of the gear unit is coupled to the main body.

Due to the integration of the gear stage in the main body, a very compact design can be achieved that opens up many options for arrangement in the vehicle.

BRIEF DESCRIPTION OF THE DRAWINGS

Figure 1:
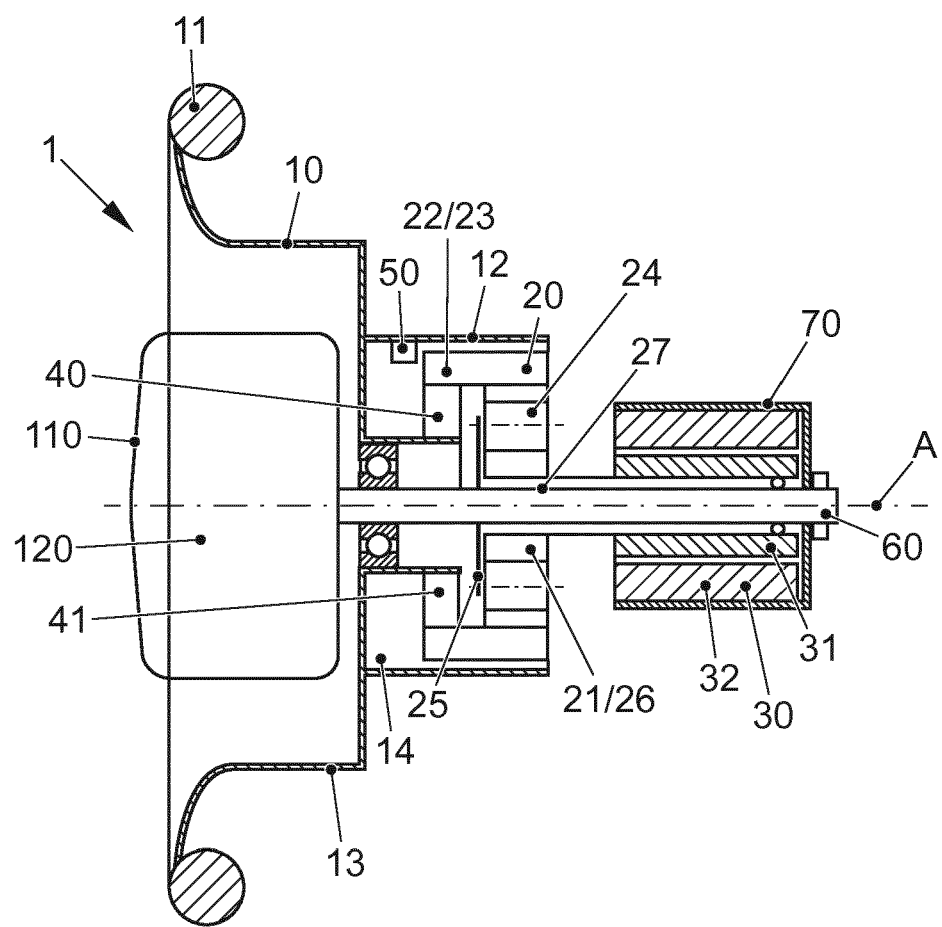
Figure 2:
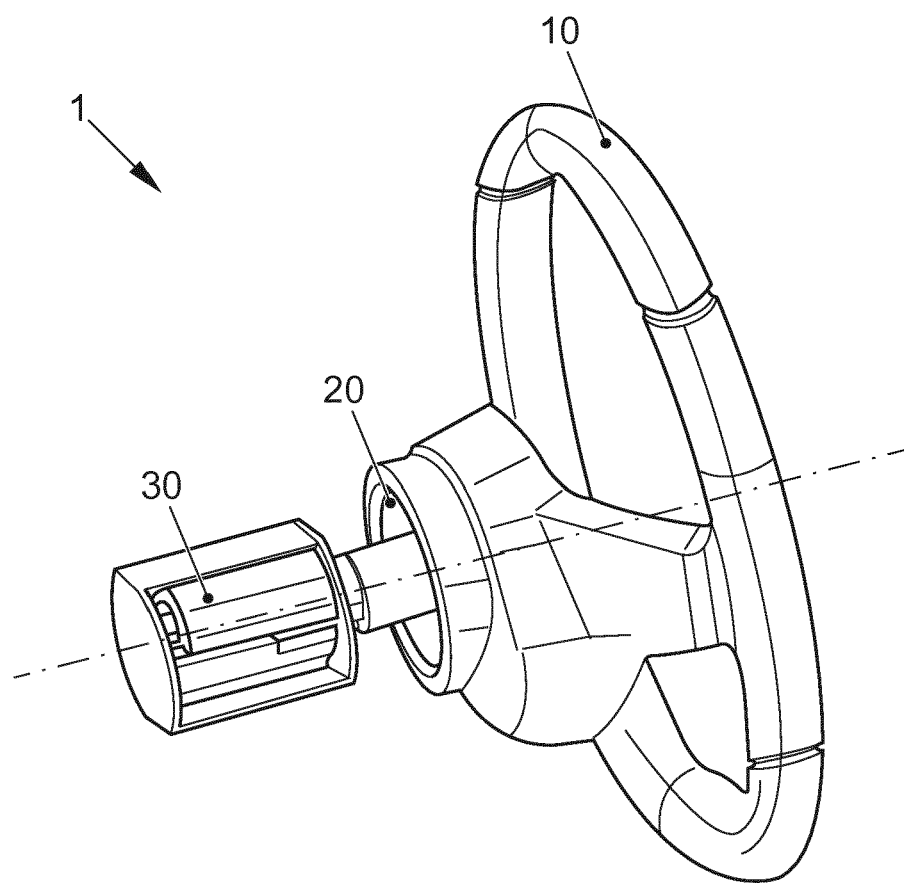
Figure 3:
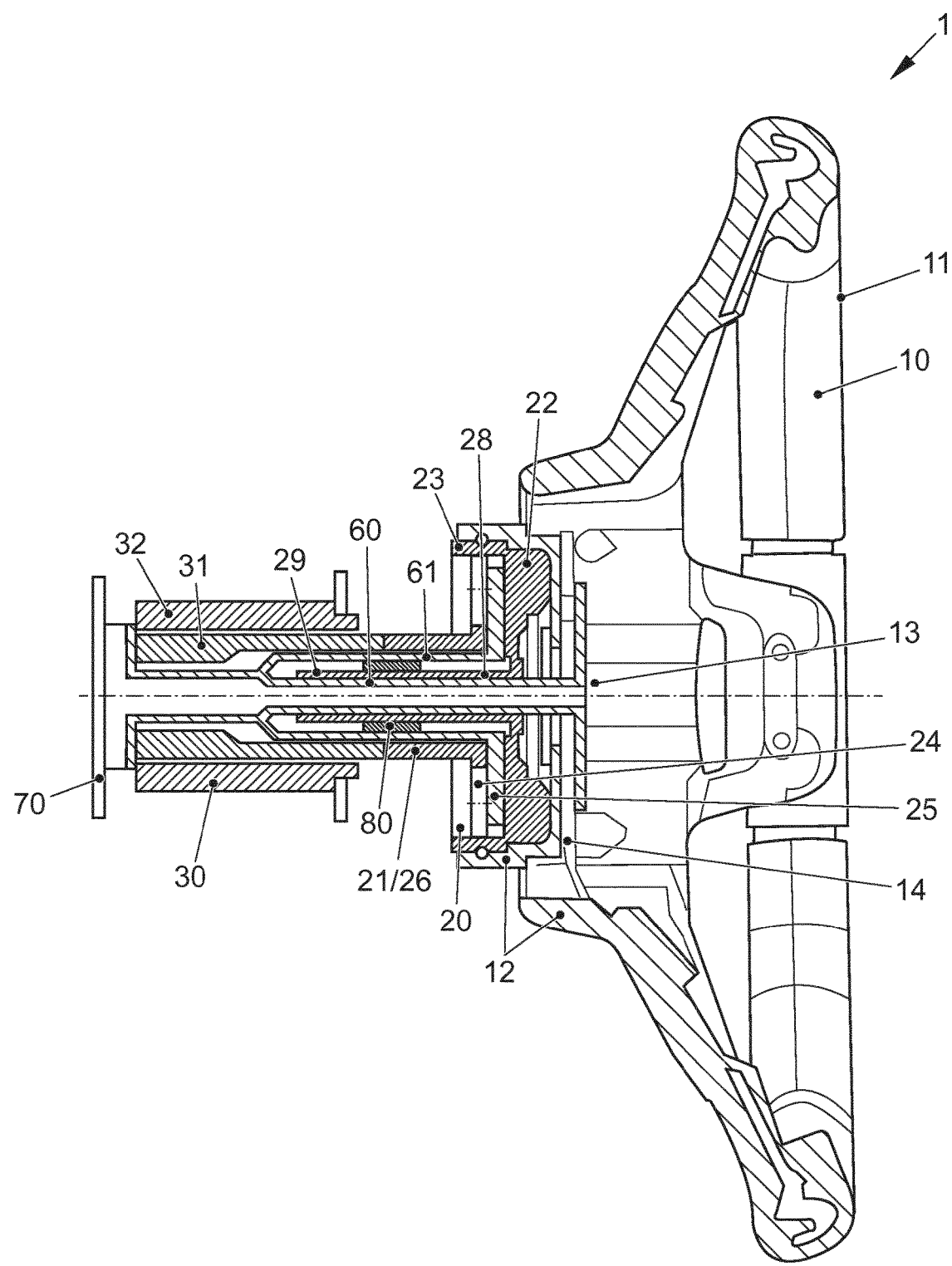
Figure 4:
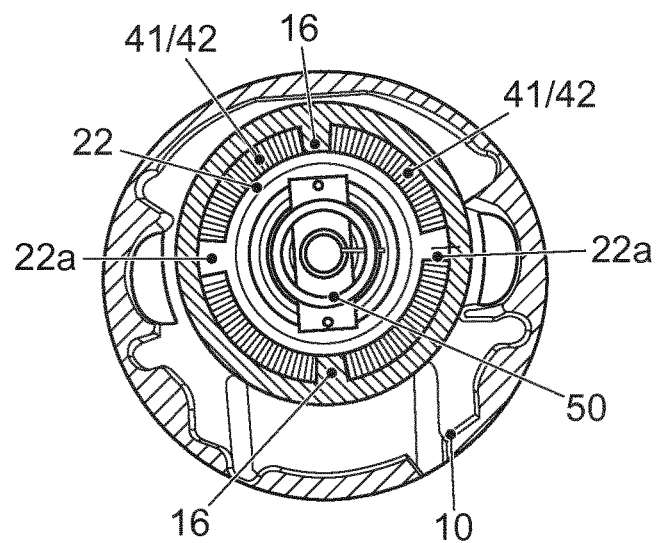
Figure 5:
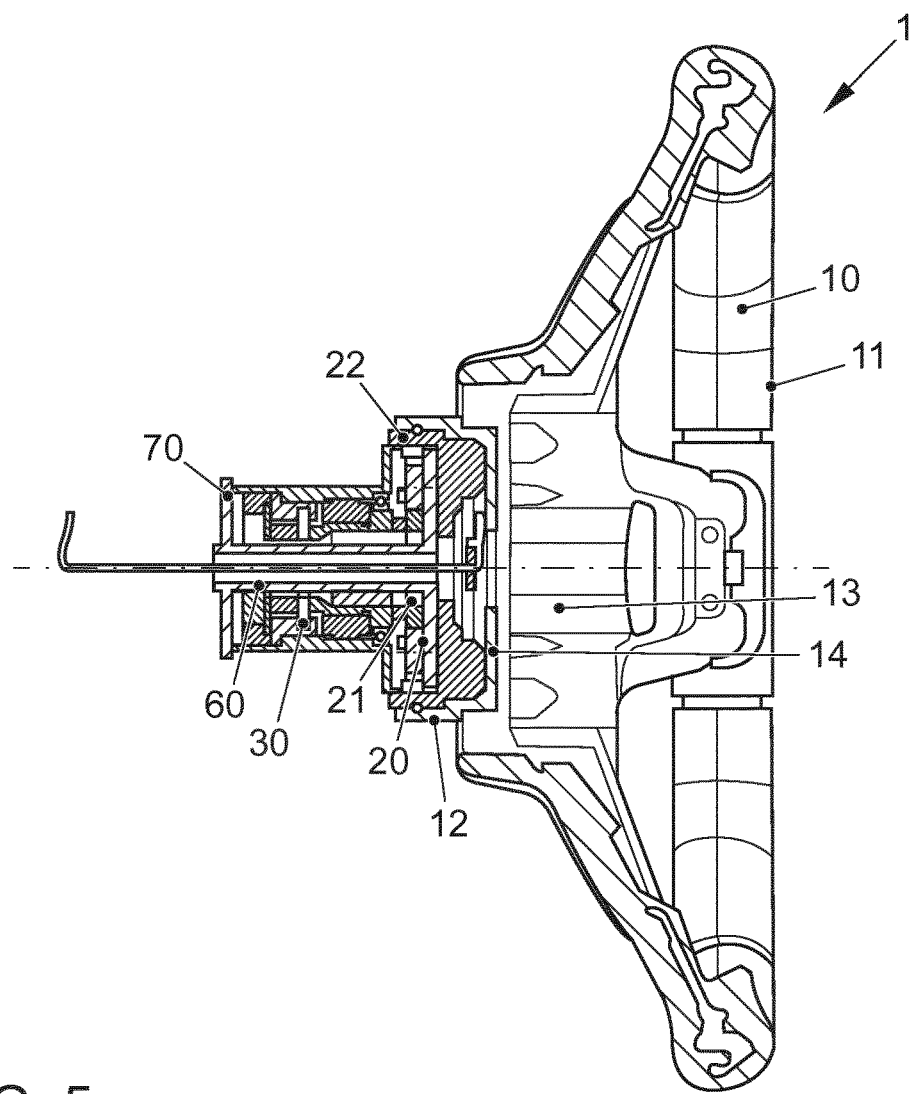
Figure 6:
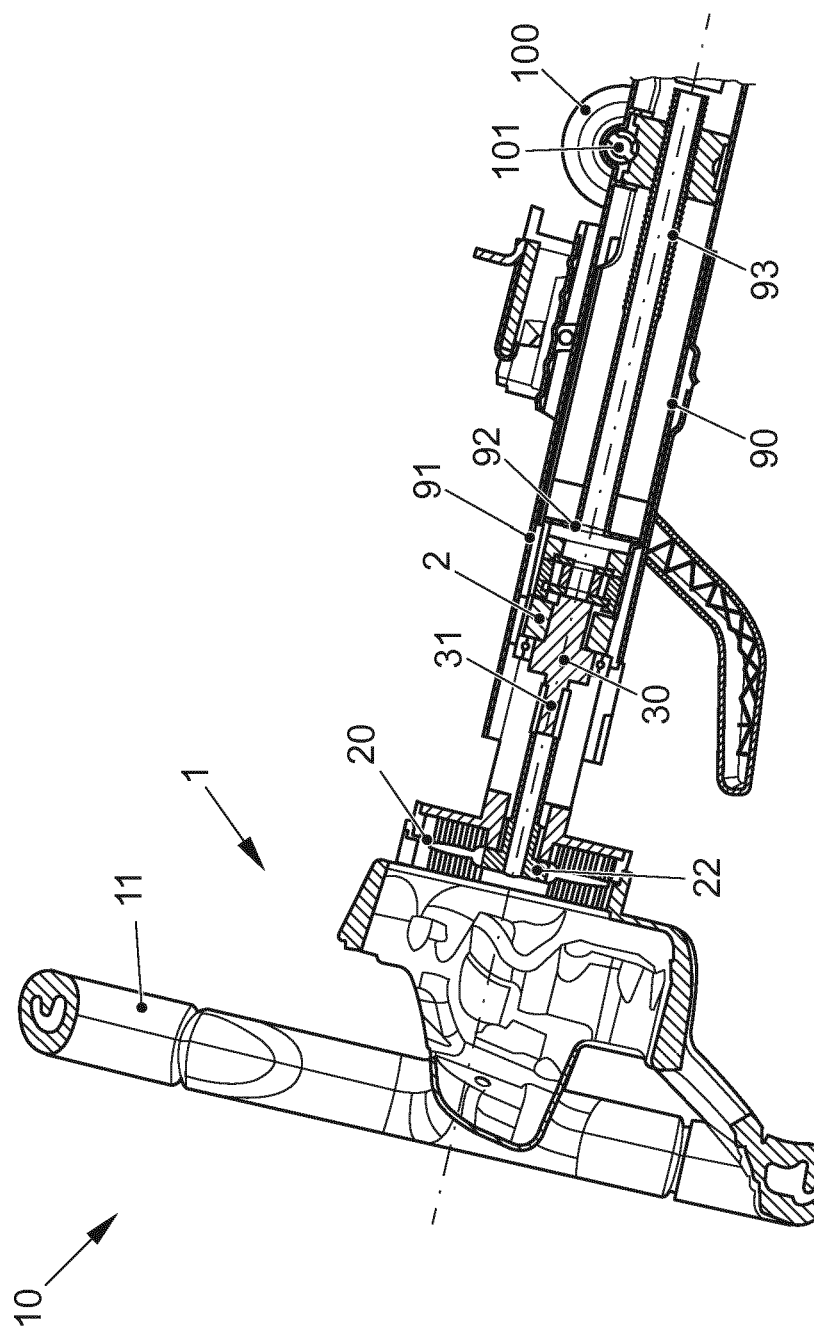
Figure 7:
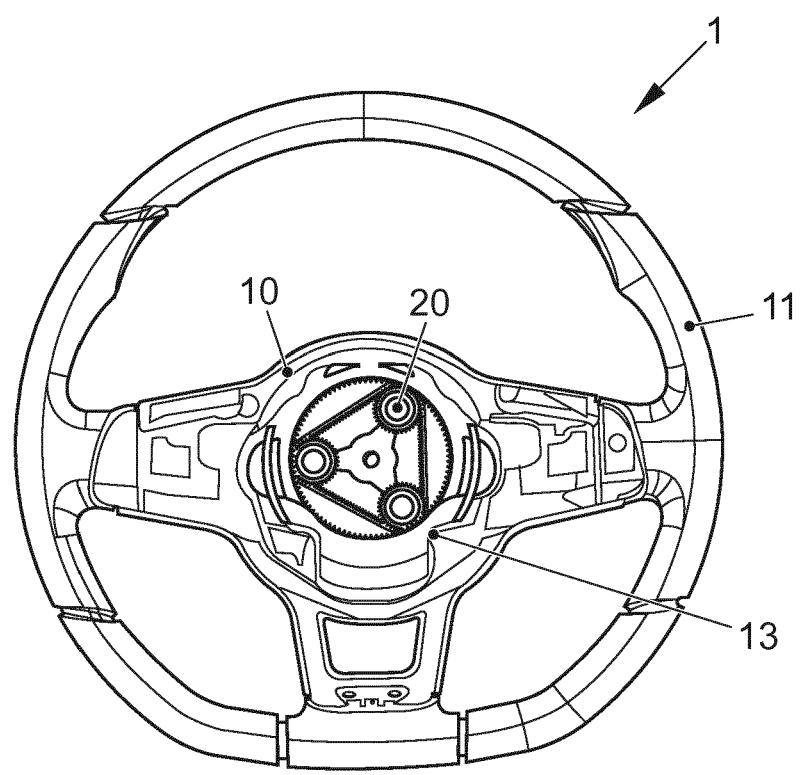

IN THE FIGS.:

FIG. 1 shows a schematic representation of a first exemplary embodiment of a steering handle;

FIG. 2 shows a steering handle according to a second exemplary embodiment;

FIG. 3 shows a longitudinal section of the steering handle according to FIG. 2;

FIG. 4 shows a view of the hub region of the steering handle according to FIG. 2 viewed from the direction of a driver;

FIG. 5 shows a longitudinal section of a steering handle according to a third exemplary embodiment;

FIG. 6 shows a longitudinal section of a steering handle according to a fourth exemplary embodiment; and FIG. 7 shows a view of the steering handle according to FIG. 6 viewed from the direction of a driver.

DETAILED DESCRIPTION

The steering handle may in some embodiments be configured as an assembly that can be coupled as needed to an electric motor and/or an electric brake apparatus to produce reaction torque in response to a driver's steering command. By creating an interface between the steering handle, in the present case at least the main body and the gear unit, and the electric motor, different approaches may be realized for generating resistance while retain the configuration of the steering handle. However it is also possible in some embodiments to combine an electric motor and/or an electric brake with the aforementioned components into an assembly, wherein the steering handle then, e.g., also integrates the electric motor and respectively the electric brake apparatus.

By using a high-ratio gear unit, i.e., a gear unit with a reduction ratio i within a range between 25 and 60—directly in the main body, and in some embodiments, it is possible to use a compact electric motor, whereby the vehicle-side required installation space remains very small.

Further embodiments are the subject matter of additional claims.

The gear unit may in some embodiments practically be accommodated in the region of a steering wheel hub. Some embodiments correspondingly provide that the receptacle for the gear unit adjoins a pot-shaped section formed in the main body to accommodate an airbag.

In some embodiments, the gear unit, e.g., the output member thereof, can be rotated relative to the main body. By doing this, it is, e.g., possible to rotatably arrange and/or mount the gear unit in the receptacle on the main body in order to securely and permanently ensure relative rotatability.

Moreover, the main body may in some embodiments be coupled to the output member of the gear unit by a torsion spring apparatus. By means of such a torsion spring apparatus, it is possible to simulate a torsion bar in a steering column of a conventional vehicle steering system with mechanical continuity in order to better simulate the steering sensation of a conventional steering system.

For a very compact design and accommodation in the main body, the torsion spring apparatus may in some embodiments have spring elements seated in annular grooves that are each braced against the main body with an end section and are braced against the output member of the gear unit with another end section.

A driver's steering command may for example be detected by means of a rotation angle sensor and/or a torque sensor. The elastic deformation of the torsion spring apparatus may, e.g., be used for this just like a torsion bar in a conventional steering system. In some embodiments, a rotation angle sensor may therefore be arranged between the main body and the output member of the gear unit to detect the relative twist between the main body and the output member of the gear unit. Alternatively or in addition and in some embodiments, an applied torque may be detected with a torque sensor.

In some embodiments, the input member of the gear unit may be coupled to an electric motor and/or an electric brake apparatus in order to produce haptic resistance to a steering command applied to the main body by the driver.

Moreover it is possible in some embodiments to design the gear unit with a central passage through which a stationary shaft extends that is coupled to a vehicle body so as not to rotate in an installed position. A stationary hub of the steering handle can, e.g., be realized with such a stationary shaft. Accordingly and for example, a deflector face of the steering handle can be designed fixed relative to which the main body, by means of which the driver enters a steering command, can rotate. This enables greater design leeway, for example for accommodating an airbag and control elements and/or display instruments such as a monitor or a touchscreen for the driver.

The stationary shaft may, e.g., be designed as a hollow shaft in order to allow electrical lines to be run to the main body, for example.

Moreover, the electric motor may be designed as a hollow shaft motor so that the stationary shaft may also extend through it.

In some embodiments, the output member of the gear unit has a sleeve section which extends into or through the input member of the gear unit, and is rotatably mounted on the stationary shaft. This allows the gear unit and the main body to be mounted stably.

Moreover, a threaded spindle may be formed on the outer circumference of the sleeve section that is in threaded engagement with a sliding body which for example is guided on a stationary sleeve, for example by its outer circumference. This can provide a steering stop for rotation angles greater than 360° from the straight-ahead position by means of which the maximum angle of rotation of the main body is limited.

Moreover it is possible to fasten the stationary shaft on a holder by means of which the steering handle can be fastened to a vehicle body, wherein the electric motor and/or the electric brake apparatus is braced against the holder, and the stationary shaft extends through the electric motor and/or the electric brake apparatus. This yields an assembly that can simulate a conventional steering wheel of a vehicle steering system with mechanical continuity.

A steering handle including the electric motor and/or the electric brake apparatus can be braced against a holder that for its part is arranged on the vehicle body in a pivotable and/or translationally movable manner, wherein the pivotability and/or the translational displaceability may be effectuated manually or actuated by a drive. This creates adjustment options similar to a conventional steering wheel. It is for example possible to attach a steering handle of the above-explained type on a conventional adjusting mechanism that may then also serve as a holder for the steering handle.

According to some embodiments, the gear unit positioned on the main body is an epicyclic gearing, which is integrated such that a planet carrier of the gear unit is secured to the stationary shaft.

In this case and in some embodiments, the sun gear of the epicyclic gearing serves as the input member for the gear unit that is coupled to a rotor of an electric motor. The outer gear of the epicyclic gearing then forms the output member which is coupled to the main body, possibly with the torsion bar simulator in between.

The invention is explained in greater detail in the following based on exemplary embodiments shown in the drawings.

The first exemplary embodiment in FIG. 1 shows a steering handle 1 for a steer-by-wire vehicle steering system by means of which a driver can enter a steering command in order to adjust a desired steering angle in a motor vehicle for the steered vehicle wheels.

The steering handle 1 has a main body 10 for being actuated by the driver that is rotatably arranged about a rotary axis A in the vehicle. The main body 10 can be designed as a steering wheel but also have a shape that deviates from conventional steering wheels. In the present case, the main body 10 has a grip region 11 that the driver can grasp with his hands to steer.

Moreover, a receptacle 12 is formed on the main body 10 in which a gear unit 20 that is explained further below is arranged. The receptacle 12 can be designed cylindrical and may, e.g., be braced against a pot-shaped section 13 of the main body 10 at the rear in which an airbag 120 as well as possibly additional control elements and display instruments may be accommodated for the driver. The control elements and display instruments can comprise a monitor or touchscreen 110.

The gear unit 20 couples the main body 10 to an electric motor 30 that serves to generate a steering sensation when a driver's steering command is applied to the main body 10 as is known from conventional vehicle steering systems with mechanical continuity from the steering wheel to the vehicle wheels.

The gear unit 20 has an input member 21 that is coupled to a rotor 31 of the electric motor 30. Moreover, the gear unit 20 has an output member 22 that is coupled to the main body 10.

The gear unit 20 may, e.g., be designed as a high-ratio gear unit with a gear ratio within a range of 25 to 60 that reduces the rotational speed of the electric motor 30. In the present case, it is arranged in a space-saving manner in the hub region 14 of the main body 10.

For the purpose of illustration, a gear unit 20 is portrayed for example in the form of an epicyclic gearing in FIG. 1. This has an outer gear 23 which simultaneously represents the output member 22 on the main body side. The outer gear 23 meshes with one or more planetary gears 24 that are each rotatably mounted on a stationary planet carrier 25. The planetary gears 24 for their part mesh with a sun gear 26 that simultaneously represents the input member 21 of the gear unit 20 coupled to the electric motor 30.

In principle, the output element 22 of the gear unit 20 can be connected to the main body 10 for conjoint rotation. However in the portrayed exemplary embodiment, a torsion spring apparatus 40 for transmitting torque is also incorporated between the output member 22 and the main body 10. It is thus mechanically series-connected to the gear unit 20. The torsion spring apparatus 40 simulates the torsion bar in the steering column of a conventional vehicle steering system with mechanical continuity. The torsion spring apparatus 40 is accommodated within the main body 10 and has one or more spring elements 41 that are each braced against the main body 10 by an end section, and are braced against the output member 22 of the gear unit 20 by another end section. The torsion spring apparatus 40 has a torsional stiffness within a range of 0.5 to 2 Nm/degree rotational angle.

A rotation angle sensor 50 detects the relative twist between the main body 10 and the output member 22 of the gear unit 20 and transmits a corresponding signal to a control apparatus (not shown) in which, taking into account additional vehicle parameters, the steering angle to be set by the steered vehicle wheels is ascertained. Moreover, a specification for controlling the electric motor 30 can be generated in the same or another control apparatus taking into account the thus-detected relative twist as well as, if applicable, other vehicle parameters by which the response of the vehicle steering system to the steering handle 1 is simulated. The extent of the steering ratio, the maximum angle of rotation and the difficulty of steering that are communicated to the driver by the steering handle 1 can be influenced through software.

For example, an option for selecting different steering identifiers may also be created for the driver that for example are kept in a control apparatus. This allows the driver to choose for example between a sportier or more comfortable steering sensation. The selection can be made using an input apparatus arranged in the operating environment of the driver. Furthermore, algorithms for automatically selecting the identifier may be in the control apparatus.

Accordingly, the control apparatus of the steering handle 1 may feature different characteristics upon a selection by the driver. In this manner, the driver can for example choose between a sporty and comfortable steering sensation.

Instead of a rotation angle sensor 50, a torque sensor may also be provided whose signal is transmitted to the control apparatus. Furthermore, it is possible to use both types of sensors, for example for the purpose of verification or for reasons of redundancy.

Instead of or in addition to the electric motor 30, an electric brake apparatus may furthermore be provided to generate a haptic resistance.

In the exemplary embodiment portrayed in FIG. 1, the gear unit 20 has a central passage 27 through which a stationary shaft 60 extends that for example may be designed as a hollow shaft. The stationary shaft 60 is non-rotatably fastened to the vehicle body and can be used to rotatably bear the aforementioned components.

In the present case, the shaft 60 is fastened to a holder 70 to which a stator 32 of the electric motor 30 is also secured. By means of the holder 70, the steering handle 1 can be arranged on an adjusting mechanism that for example allows a pivoting of the rotary axis A relative to the motor vehicle, and furthermore a displacement toward the rotary axis A.

The shaft 60 extends through the rotor 31 of the electric motor 30. An airbag arranged on the main body 10 as well as other control elements can be electrically connected to the shaft 60.

Since the shaft 60 can extend through the gear unit 20 into the main body 10, it is possible to support the airbag as well as the control elements and display instruments on the shaft 60 so that they do not also rotate when the main body 10 rotates but always remain in the same position.

FIGS. 2 to 4 show a steering handle 1 for a steer-by-wire vehicle steering system according to a second exemplary embodiment with which the above-explained approach is implemented in a compact steering actuator that enables rotation angles about the rotary axis A of more than 360° in each direction of rotation from a starting position for straight-ahead travel.

The steering handle 1 also has a main body 10 that can be rotated by a driver around the rotary axis A in order to produce a driver's steering command.

In a hub region 14 around the rotary axis A, the main body 10 forms a receptacle 12 that is, e.g., designed cylindrical in which, as mentioned above, an, e.g., high-ratio gear unit 20 is arranged. At the rear, the receptacle 12 abuts a section 13 of the main body 10 that serves as a receptacle for an airbag and/or control elements for the driver.

The gear unit 20 also has an input member 21 that is drivingly coupled to a rotor 31 of an electric motor 30 and an output element 22 that is drivingly coupled to the main body 10.

The output element 22 can be rotatably supported on the main body 10 by a bearing in the receptacle 12 around the rotary axis A.

Even though not shown, an electric brake apparatus can be provided in addition or instead of the electric motor 30.

FIG. 1 shows an example of a high-ratio gear unit 20 in the form of an epicyclic gearing. As an output element 22, this has an outer gear 23 that meshes with one or more planetary gears 24. The planetary gear(s) 24 are rotatably mounted on a fixed planet carrier 25 that is supported on a stationary shaft 60. For their part, the planetary gear(s) 24 mesh with a sun gear 26 that is coupled to the rotor 31 of the electric motor 30 as the input member 21 of the gear unit 20.

The output member 22 of the gear unit 20 in this case has a sleeve section 28 which extends into or through the input member 21 of the gear unit 20, and is rotatably mounted on the stationary shaft 60. A threaded spindle 29 is formed on the outer circumference of the sleeve section 28. This threaded spindle 29 engages in the thread of a sliding body 80 that is guided on a stationary sleeve 61 for example with its outer circumference, and whose path of movement along the threaded spindle 29 is limited. This creates a mechanical end stop for the maximum rotation angle of the main body 10 from the starting position. The stationary sleeve 61 can be formed on or fastened to the stationary shaft 60.

A torque spring apparatus 40 for transmitting torque is incorporated between the output member 22 and the main body 10 so that the main body 10, the torque spring apparatus 40 and the gear unit 20 are mechanically series-connected with respect to the transmission of torque.

The torsion spring apparatus 40 is accommodated within the main body 10 and has one or more spring elements 41 that are each braced against the main body 10 by an end section, and are braced against the output member 22 of the gear unit by another end section. FIG. 4 shows an example of several helical springs 42 that are accommodated in corresponding annular grooves 15 and are braced against projections 16 on the main body and corresponding projections 22a on the output member 22 of the gear unit 20.

A rotation angle sensor 50 detects the relative twist between the main body 10 and the output member 22 of the gear unit 20 and transmits a corresponding signal to a control apparatus (not shown) for adjusting a steering angle at the vehicle wheels, and for controlling the electric motor 30 and/or an electric brake device as already explained above.

The electric motor 30 is fastened to a holder 70 by means of which the steering handle 1 can be attached to an adjusting mechanism that enables a pivoting of the rotary axis A of the steering handle 1 and furthermore a displacement in the direction of the rotary axis A.

The stationary shaft 60 is fixed on the holder 70 and extends through the electric motor 30 designed as the hollow shaft motor and, e.g., into the main body 10 as was already explained above in conjunction with FIG. 1.

FIG. 5 shows an example of a third exemplary embodiment that portrays an alteration of the aforementioned exemplary embodiments. Corresponding components are therefore provided with the same reference numbers. In contrast to the second exemplary embodiment, there is no spindle extension of the output member 22 of the gear unit 20 which yields a somewhat shorter installation length in the direction of the rotary axis A. This is, e.g., suitable for steering handles 1 in which the maximum rotation angle from the starting position is to remain less than 180° in both directions. Moreover, another variation of an electric motor 30 is portrayed. Since the electric motor 30 is directly arranged on the gear unit 20, the cover of the gear unit 20 may also be designed integrally with a housing 33 of the electric motor 30.

FIGS. 6 and 7 show a fourth exemplary embodiment of a steering handle 1 for illustrating other possible alterations, and for portraying an adjusting mechanism 90 for the steering handle 1. The same components as above are again provided with same reference numbers here as well.

The adjusting mechanism 90 enables a pivotability of the steering handle 1 as well as a translatory displaceability of the same basically in the direction of the rotary axis A. In this case, the translatory displaceability can be effectuated by means of another electric motor 100. The steering handle 1 is introduced by its motor-side end section 2 into a sleeve 91 and fastened to a displaceable slide 92. The slide 92 is connected to a spindle or rack 93 that can be adjusted relative to the sleeve 91 by a drive pinion 101 provided on another electric motor 100.

Moreover in the fourth exemplary embodiment, a cyclobelt gear unit is arranged as the gear unit 20 on the main body 10 instead of an epicyclic gearing. This gear output member 22 is in turn connected to a rotor 31 of the electric motor 30, whereas the gear input member 21 is coupled to the main body 10 either directly, or with an intermediate torque spring apparatus. Instead of a cyclobelt gear unit, an eccentric gear unit can for example also be used.

Furthermore and independent of the above considerations, a steering handle 1 is disclosed for inputting a driver's steering command into a steer-by-wire vehicle steering system, wherein this steering handle 1 has a fixed hub with a grip section 11 that is rotatable relative thereto. A monitor or touchscreen 110 is arranged on the fixed hub. The monitor or touchscreen 110 can for example be a flexible OLED display. The hub can be a deflector face for the driver. An airbag 120 can be arranged under the monitor or touchscreen 110. Such a steering handle 1 can be developed as explained above and/or as indicated in the claims.

The invention was explained above using exemplary embodiments and additional alterations. Individual technical features that were explained above in the context of other individual features can be realized both independent thereof as well as in combination with other individual features even when this is not expressly described above, as long as it is technically feasible. The invention is expressly not restricted to the described exemplary embodiments and alterations but rather comprises at least all of the embodiments defined by the claims.

In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

1 Steering handle
2 End section
10 Main body
11 Grip section
12 Receptacle
13 Section for accommodating an airbag
14 Hub region
15 Annular groove
16 Projection
20 Gear unit
21 Input member
22 Output member
22a Projection
23 Outer gear
24 Planetary gear
25 Planet carrier
26 Sun gear
27 Passage
28 Sleeve section
29 Threaded spindle
30 Electric motor
31 Rotor
32 Stator
33 Housing
40 Torsion spring apparatus
41 Spring element
42 Helical spring
50 Rotation angle sensor
60 Stationary shaft
61 Stationary sleeve
70 Holder
80 Sliding element
90 Adjusting mechanism
91 Sleeve
92 Slide
93 Rack or spindle
100 Additional electric motor
101 Pinion
110 Monitor or Touchscreen
120 Airbag
A Rotary axis

What is claimed is:

1. A steering handle for inputting a driver's steering command into a steer-by-wire vehicle steering system having a main body for actuation by the driver, the main body being rotatably mounted on a stationary shaft, wherein a receptacle is formed on the main body, which receptacle is connected to the main body so that the receptacle rotates with the main body, wherein a gear unit is arranged in the receptacle, wherein an input member of the gear unit can be coupled to one or more of an electric motor and an electric brake apparatus, and an output element of the gear unit is coupled to the main body.

2. The steering handle of claim 1, wherein the gear unit is rotatably arranged in the receptacle of the main body.

3. The steering handle of claim 2, wherein the main body is coupled by a torsion spring apparatus to the output member of the gear unit.

4. The steering handle of claim 1, wherein the main body is coupled by a torsion spring apparatus to the output member of the gear unit.

5. The steering handle of claim 4, wherein the torsion spring apparatus has spring elements accommodated in annular grooves that are each braced against the main body by one end section, and are braced against the output member of the gear unit by another end section.

6. The steering handle of claim 1, wherein one or more of a rotation angle sensor and a torque sensor is arranged between the main body and the output member of the gear unit for detecting a relative twist between the main body and the output member of the gear unit.

7. The steering handle of claim 1, wherein the gear unit has a central passage through which the stationary shaft extends that, when in an installed position, is non-rotatably coupled to a vehicle body.

8. The steering handle of claim 7, wherein the stationary shaft is fastened to a holder using which the steering handle can be fastened to the vehicle body, wherein the one or more of the electric motor and the electric brake apparatus is braced against the holder, and the stationary shaft extends through the one or more of the electric motor and the electric brake apparatus.

9. The steering handle of claim 7, wherein the gear unit is an epicyclic gearing, and a planet carrier of the gear unit is fixed on the stationary shaft, and/or a sun gear of the epicyclic gearing is coupled as the input member of the gear unit to a rotor of the electric motor.

10. The steering handle of claim 1, wherein the input member of the gear unit is coupled to the one or more of the electric motor and the electric brake apparatus in order to produce haptic resistance to a steering command applied to the main body by the driver.

11. The steering handle of claim 1, wherein the output member of the gear unit has a sleeve section which extends into or through the input member of the gear unit, and is rotatably mounted on the stationary shaft.

12. The steering handle of claim 11, wherein a threaded spindle is formed on the outer circumference of the sleeve section that is in threaded engagement with a sliding body which is guided on a stationary sleeve.

13. The steering handle of claim 1, wherein said steering handle including the one or more of the electric motor and the electric brake apparatus is braced against a holder that is arranged on a vehicle body in a pivotable and/or translationally displaceable manner, wherein the pivotability and/or the ability to move translationally can be effectuated manually or actuated by a drive.

14. The steering handle of claim 1, wherein a control apparatus is provided which offers different identifiers for the steering system that are selectable by the driver, or automatically selectable by a selection algorithm.

15. The steering handle of claim 1, wherein said steering handle has a fixed hub with a grip section that is rotatable relative thereto, and a monitor or touchscreen is arranged on the fixed hub.

16. A steering handle for inputting a driver's steering command into a steer-by-wire vehicle steering system having a rotatably mounted main body for actuation by the driver, wherein
a receptacle is formed on the main body in which a gear unit is arranged, wherein
an input member of the gear unit can be coupled to one or more of an electric motor and an electric brake apparatus, and an output element of the gear unit is coupled to the main body, wherein
the gear unit has a central passage through which a stationary shaft extends that, when in an installed position, is non-rotatably coupled to a vehicle body, wherein
the stationary shaft is fastened to a holder using which the steering handle can be fastened to the vehicle body, and wherein
the one or more of the electric motor and the electric brake apparatus is braced against the holder, and the stationary shaft extends through the one or more of the electric motor and the electric brake apparatus.

17. A steering handle for inputting a driver's steering command into a steer-by-wire vehicle steering system having a rotatably mounted main body for actuation by the driver, wherein
a receptacle is formed on the main body in which a gear unit is arranged, wherein
an input member of the gear unit can be coupled to one or more of an electric motor and an electric brake apparatus, and an output element of the gear unit is coupled to the main body, wherein
the output member of the gear unit has a sleeve section which extends into or through the input member of the gear unit, and is rotatably mounted on a stationary shaft.

18. A steering handle for inputting a driver's steering command into a steer-by-wire vehicle steering system having a rotatably mounted main body for actuation by the driver, wherein
a receptacle is formed on the main body in which a gear unit is arranged, wherein
an input member of the gear unit can be coupled to one or more of an electric motor and an electric brake apparatus, and an output element of the gear unit is coupled to the main body, wherein
the gear unit has a central passage through which a stationary shaft extends that, when in an installed position, is non-rotatably coupled to a vehicle body, wherein
the gear unit is an epicyclic gearing, and a planet carrier of the gear unit is fixed on the stationary shaft, and/or a sun gear of the epicyclic gearing is coupled as the input member of the gear unit to a rotor of the electric motor.

* * * * *